United States Patent
Romea et al.

(10) Patent No.: US 12,360,750 B2
(45) Date of Patent: Jul. 15, 2025

(54) METHOD FOR IMPLEMENTING A SOFTWARE MODULE DEFINED BY A NON-INTERLEAVED DIRECTED ACYCLIC GRAPH IN A MULTICORE ENVIRONMENT

(71) Applicant: Vitesco Technologies GmbH, Regensburg (DE)

(72) Inventors: Nicolas Romea, Toulouse (FR); Julien Durand, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 75 days.

(21) Appl. No.: 18/276,947

(22) PCT Filed: Mar. 23, 2022

(86) PCT No.: PCT/EP2022/057593
§ 371 (c)(1),
(2) Date: Aug. 11, 2023

(87) PCT Pub. No.: WO2022/207424
PCT Pub. Date: Oct. 6, 2022

(65) Prior Publication Data
US 2024/0118879 A1   Apr. 11, 2024

(30) Foreign Application Priority Data
Mar. 29, 2021  (FR) ...................................... 2103153

(51) Int. Cl.
*G06F 8/41*   (2018.01)
(52) U.S. Cl.
CPC .............. *G06F 8/458* (2013.01); *G06F 8/451* (2013.01); *G06F 8/456* (2013.01)

(58) Field of Classification Search
None
See application file for complete search history.

(56) References Cited

U.S. PATENT DOCUMENTS

| 5,768,594 | A | * | 6/1998 | Blelloch | ............... G06F 9/5066 717/149 |
| 7,979,844 | B2 | | 7/2011 | Srinivasan | |
| 8,521,570 | B2 | | 8/2013 | Sadiq | |
| 9,436,502 | B2 | | 9/2016 | Burckhardt et al. | |

(Continued)

FOREIGN PATENT DOCUMENTS

DE       3707585 A1    10/1987

OTHER PUBLICATIONS

Blelloch et al., "Provably Efficient Scheduling for Languages with Fine-Grained Parallelism", Journal of the Association for Computing Machinery, ACM,, 1999, vol. 46, No. 2, pp. 281-321.

(Continued)

*Primary Examiner* — Qing Chen
(74) *Attorney, Agent, or Firm* — Buchanan Ingersoll & Rooney PC

(57) ABSTRACT

An elementary method for implementing a software module defined by an elementary directed acyclic graph, including the following steps: copying the code of the initial sequence, adding a fork function at the end of the initial sequence, copying the code of a parallel sequence, adding a join flag function at the end of said parallel sequence, copying the code of the other parallel sequence, adding a join wait function at the end of the other parallel sequence.

11 Claims, 7 Drawing Sheets

(56) References Cited

U.S. PATENT DOCUMENTS

| | | |
|---|---|---|
| 9,747,108 B2 | 8/2017 | Ben-Kiki et al. |
| 2006/0230409 A1 | 10/2006 | Frigo et al. |
| 2007/0011684 A1* | 1/2007 | Du ........................ G06F 9/3009 712/E9.05 |
| 2009/0165016 A1 | 6/2009 | Bell, Jr. et al. |
| 2012/0096443 A1 | 4/2012 | Seo et al. |
| 2012/0096474 A1 | 4/2012 | Jiao |
| 2012/0204014 A1 | 8/2012 | Leather et al. |
| 2014/0359563 A1* | 12/2014 | Xie ........................... G06F 8/34 717/106 |
| 2016/0283245 A1 | 9/2016 | Ben-Kiki et al. |

OTHER PUBLICATIONS

Margerm et al., "TAPAS: Generating Parallel Accelerators from Parallel Programs", 2018 51st Annual IEEE/ACM International Symposium on Microarchitecture (Micro) IEEE, 2018, pp. 245-257.

International Search Report and Written Opinion for International Application No. PCT/EP2022/057593, dated Jul. 20, 2022, 11 pages.

International Search Report and Written Opinion for International Application No. PCT/EP2022/057593, dated Jul. 20, 2022, 18 pages (French).

\* cited by examiner

METHOD FOR IMPLEMENTING A SOFTWARE MODULE DEFINED BY A NON-INTERLEAVED DIRECTED ACYCLIC GRAPH IN A MULTICORE ENVIRONMENT

CROSS REFERENCE TO RELATED APPLICATIONS

This application is the U.S. National Phase Application of PCT International Application No. PCT/EP2022/057593, filed Mar. 23, 2022, which claims priority to French Patent Application No. 2103153, filed Mar. 29, 2021, the contents of such applications being incorporated by reference herein.

FIELD OF THE INVENTION

The invention relates to a method for implementing a software module defined by a non-interleaved directed acyclic graph comprising executables allocated over a plurality of cores.

BACKGROUND OF THE INVENTION

In the field of on-board systems, computers currently use microprocessors having a plurality of calculation units or cores. This allows the simultaneous parallel execution of a plurality of software units.

On-board systems are often real-time systems for which the response time of the software is a critical element, in terms of both functionality (control of a heat engine, for example) and safety (for example, cutting the fuel injection of a heat engine to ensure safety by stopping a vehicle).

On-board real-time systems provide control functions for controlling various actuators such as pumps, injectors, valves, etc. The algorithms implementing these control functions must often be executed in a very precise sequence to ensure that the results calculated by one algorithm are taken into account by the next algorithm in the shortest possible time, thus providing a better system response time.

The algorithms are implemented in functions called executable units, executed by software tasks synchronized on system events which may be timed cyclically on a timebase (1 ms, 5 ms, 10 ms, 100 ms, . . . ) or on a signal supplied by an event (position of the engine, reception of a message, . . . )

These control algorithms were originally developed to be executed by single-core microprocessors for which execution can only be sequential. The same algorithms are currently being re-used on multi-core microprocessors for which execution may be carried out in parallel.

It is desirable to ensure that these algorithms have the same real-time behavior, regardless of whether they are executed by a single-core or multi-core microprocessor. It is advantageous to make use of the power provided by the different cores, but the calculation sequences, the response times of the functions and the coherence of shared data must be preserved. At present, microprocessors each contain a plurality of cores, typically 3 to 10. They are expected to contain several hundred cores in the near future.

An advantageous paradigm for describing a parallelized algorithm is "Fork and Join" or "Divide and Conquer". Using this paradigm, it is possible to convert a linear execution scheme, as illustrated in FIG. 1, showing a software module comprising 42 executable units E in sequence in a single core, into a parallelized scheme as illustrated in FIG. 2, where a separation of the execution into a plurality of cores is denoted by a fork f and joining of the execution is denoted by a join j. FIG. 3 illustrates the final implementation of the different executable units E in three cores C1-C3.

By means of this paradigm, the structure of a software module can be defined using a non-interleaved directed acyclic graph G as illustrated in FIGS. 4, 6-9 and 13. Each point or node of the graph G is an executable unit E. An executable unit E is defined by its code, which must be sequential and executable in a single core C1-C4. Said code is stored in the graph G or indexed by the graph G. The graph G also comprises information about the allocation of each executable unit E to one of the cores C1-C4, that is to say the core C1-C4 on which this executable unit E is to be executed.

An aspect of the invention proposes to define a method for implementing a software module thus defined by a non-interleaved directed acyclic graph G and by the codes of the executable units E.

SUMMARY OF THE INVENTION

For this purpose, an aspect of the invention relates to an elementary method for implementing a software module defined by an elementary directed acyclic graph comprising executable units arranged in four sequences, each allocated to one core, namely an initial sequence executable on a first core, followed by a fork to a first parallel sequence executable on a second core and a second parallel sequence executable on a third core, different from the second core, in parallel with the first parallel sequence, the two parallel sequences being followed by a join to a final sequence executable on a fourth core, comprising the following steps: copying the code of the initial sequence, adding a fork function at the end of the initial sequence, copying the code of a parallel sequence, adding a join flag function at the end of said parallel sequence, copying the code of the other parallel sequence, and adding a join waiting function at the end of the other parallel sequence.

Particular features or embodiments, which are usable on their own or in combination, are:
  the fork function is capable of initiating the execution of the first parallel sequence if the core of the first parallel sequence is different from the core of the initial sequence, initiating the execution of the second parallel sequence if the core of the second parallel sequence is different from the core of the initial sequence, and initializing a flag to the lowered state,
  the join flag function is capable of raising the flag,
  the join wait function is capable of waiting until the flag is lowered and initiating the execution of the final sequence if the core of the final sequence is different from the core of the parallel sequence comprising the join wait function, when the flag is raised,
  the sequence receiving the fork function is the initial sequence,
  if the core of the final sequence is identical to the core of a parallel sequence, said parallel sequence receives the join wait function,
  if the core of the final sequence is different from the cores of the parallel sequences, the parallel sequence receiving the join wait function is the less reactive parallel sequence of the two parallel sequences, that is to say the sequence having a higher response time,
  the join wait function waits while calling a schedule point.

In a second aspect of the invention, a global method for implementing a software module defined by a non-interleaved directed acyclic graph comprising executable units, each allocated to one core, comprising the following steps: identifying all the forks, one fork comprising at least two downstream executable units, identifying all the joins, a join comprising at least two upstream executable units, identifying the sequences, a sequence being a succession of executable units comprising no forks or joins and allocated to the same core, simplifying the multiple forks, each comprising one upstream sequence and a number n, strictly greater than 2, of downstream sequences, replacing with n-1 two-way forks comprising 2 downstream sequences, the additional forks thus created being allocated to the core of the upstream sequence, simplifying multiple joins, comprising a downstream sequence and a number n, strictly greater than 2, of upstream sequences, replacing with n-1 two-way joins comprising 2 upstream sequences, the additional joins thus created being allocated to the core of the downstream sequence, pairing each join with a dual fork: for each join, tracing its upstream sequences upward until any fork where the upstream sequences join is found, associating a found fork with the join, if a join is an "orphan", creating a virtual fork at the start of its upstream sequences, joining the upstream sequences, if a fork is an "orphan", creating a virtual join at the end of its downstream sequences, joining the downstream sequences, for each dual fork and join pair defining an elementary graph, applying the elementary method, reordering said elementary graph into an executable unit, and iterating of the two preceding steps until the graph is exhausted.

Particular features or embodiments, which are usable on their own or in combination, are:
  a virtual join is allocated to the most reactive core of the sequences downstream of its associated fork,
  in the pairing step, if more than one choice is possible, the pairs whose joins have least combination are associated, or as a last resort an arbitrary choice is made.

BRIEF DESCRIPTION OF THE DRAWINGS

Aspects of the invention will be better understood from reading the following description, given solely by way of example, and with reference to the appended figures, in which.

DETAILED DESCRIPTION OF THE PREFERRED EMBODIMENTS

A software module is considered to be described by a graph G, Ge. A graph G, Ge is the input data of an aspect of the invention.

Examples of graphs G, Ge are given in FIGS. 4, 6-9 and 13. A graph G, Ge is assumed to be a non-interleaved directed acyclic graph. The chronological order of execution is read from left to right. A graph G, Ge comprises a plurality of executable units E, denoted by points on the graph diagrams. The segments between the points indicate the relative chronology of the executable units E. A graph G, G3 comprises, for each executable unit E, information about allocation, in other words the specification of the core C1-C4 on which this executable unit is to be executed. A fork f appears when an executable unit has a single executable unit upstream and more than one executable unit downstream. In a dual arrangement, a join j appears when an executable unit has more than one executable unit upstream and a single executable unit downstream.

A sequence S is a continuous succession of executable units E comprising no forks f or joins j and having all of its executable units E assigned to the same core C1-C4.

An aspect of the invention relates to a method, referred to as global in the claims, for implementing a graph G in accordance with the above hypotheses. This implementation may be carried out manually by a human operator. More advantageously, it may be automated. The result of this method is an implementation of a software module, in other words a code that can be executed on a multi-core microprocessor. This software module may, for example, be an engine control for controlling a heat engine of a motor vehicle.

An aspect of the invention also relates to a method, referred to as elementary in the claims, for implementing an elementary graph Ge. This elementary method is intended to be used by the global method.

A graph G, Ge may be described in a graphic manner, as illustrated in the various figures, for the attention of a human operator. If the implementation is to be carried out by an automatic process, a graph G, Ge may be described by any method of representation, whether textual or numeric.

Starting from a graph G, the global method aims to pre-process and simplify this graph G, so as to create concatenated or interleaved elementary graphs Ge. By iteratively applying the elementary implementation method to each of the elementary graphs Ge identified, the whole of the graph G can be implemented.

The elementary method for implementing a software module defined by a directed acyclic elementary graph Ge is therefore described first.

Figure 1:
FIG. 1 shows an example of a sequential software module.
Figure 2:
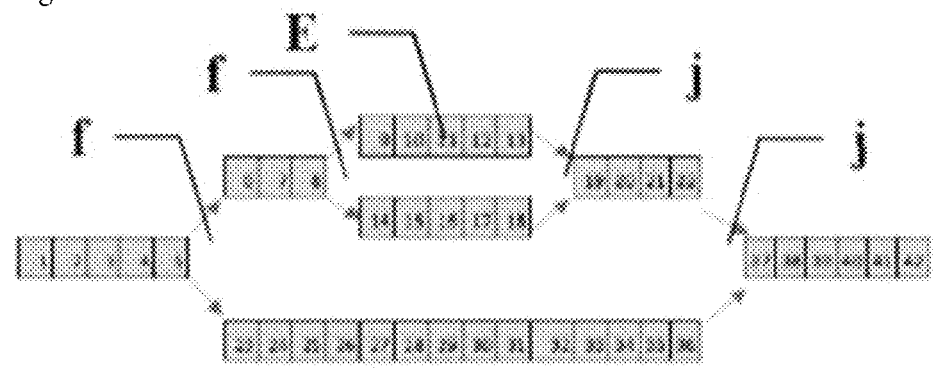
FIG. 2 shows the same software module parallelized.
Figure 3:
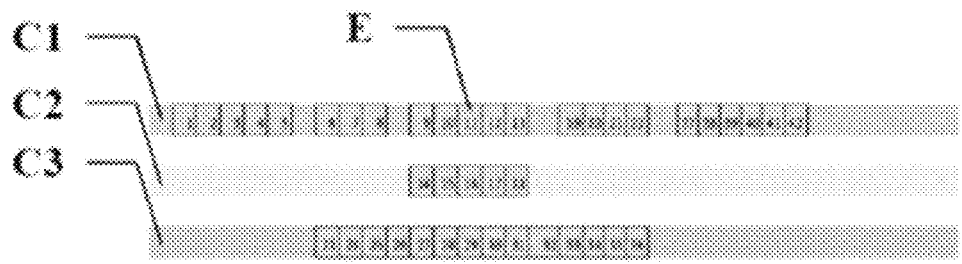
FIG. 3 shows an implementation of the software module of FIG. 2.
Figure 4:
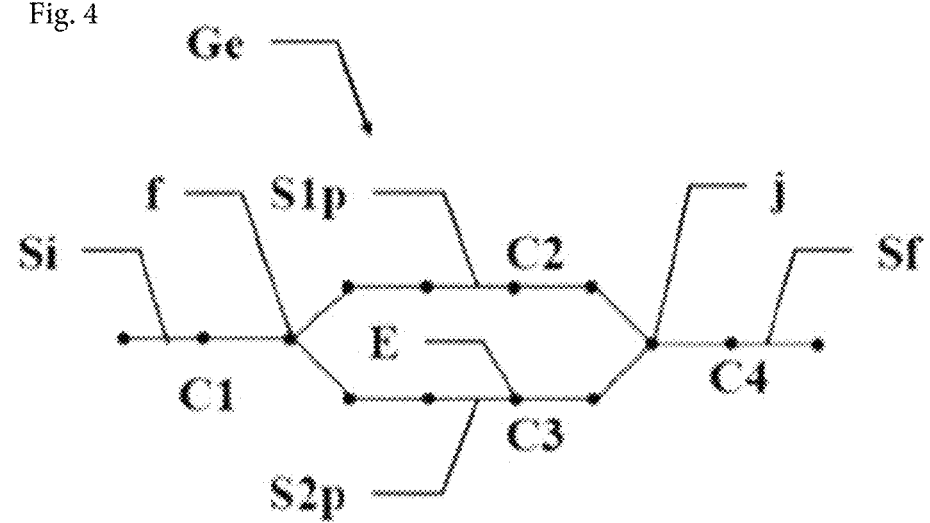
FIG. 4 shows an elementary graph.

As illustrated in FIG. 4, an elementary graph Ge, like any graph, comprises a plurality of executable units E, and is a directed acyclic graph. These executable units E are arranged in four sequences Si, S1$p$, S2$p$, Sf, each allocated to a core C1-C4. In the order of execution, from left to right in the figure, an initial sequence Si can be distinguished. This initial sequence Si is executable on a first core C1.

This initial sequence Si is terminated by a fork f. This fork f transfers the parallel execution stream to two parallel sequences S1$p$ and S2$p$. The first parallel sequence S1$p$ is assigned to/executable on a second core C2. The second parallel sequence S2p is assigned to/executable on a third core C3. The two parallel sequences S1p, S2p are executed in parallel.

A join j follows the two parallel sequences S1p, S2p and combines the two execution streams into a single stream. Downstream of the join j, there is a single final sequence Sf executable on a fourth core C4. The final sequence Sf starts when the two parallel sequences S1p and S2p terminate.

Since this is a parallel operation, the two parallel sequences S1p, S2p cannot be executed on the same core. Thus the third core C3 must be different from the second core C2. Conversely, the first core C1 may be identical to the second core C2, the third core C3 or even the fourth core C4. Similarly, the fourth core C4 may be identical to the first core C1, the second core C2 or even the third core C3. The four cores C1-C4 may also be different.

According to one characteristic, the elementary method, starting from this archetypal elementary graph Ge, implements a software module according to the following steps.

Any sequence, by definition, includes no fork f or join j, and all of its executable units E are allocated to the same core C1-C4. Thus a sequence may be considered as a single executable unit. Thus its code comprises the ordered succession of the codes of the various executable units E of which it consists.

Thus, in a first step, the code of the initial sequence Si is copied into the code of the future implementation. The codes of each of the executable units E are stored in the elementary graph Ge or in a storage means indexed by the elementary graph Ge, and are available at the input of the implementation methods.

In another step, a fork function F is added after the code of the initial sequence Si. A fork function F implements a fork f. A fork function F has two functions, one being to initiate the execution of the two parallel sequences S1p, S2p if required, and the other being to initialize a flag associated with the dual fork f and join j pair. A flag is a Boolean variable. The flag is initialized to the lowered state.

If one of the two parallel sequences S1p, S2p is allocated to the same core C1 as the initial sequence Si, its execution starts when the fork function F terminates, the execution stream being transmitted naturally to this parallel sequence S1p, S2p whose code is placed after the fork function F. Conversely, for a parallel sequence S1p, S2p allocated to a core other than the core C1 that executes the initial sequence Si and the fork function F, initiation should be provided by a concatenation mechanism.

Thus the fork function F initiates the execution of the first parallel sequence S1p if the core C2 of the first parallel sequence is different from the core C1 of the initial sequence Si, and the fork function F initiates the execution of the second parallel sequence S2p if the core C3 of the second parallel sequence S2p is different from the core C1 of the initial sequence Si. Thus the fork function F initiates one or two executions, depending on the case concerned.

The implementation further comprises a step which creates a copy of the code of a parallel sequence S1p, S2p. A join flag function Jf is added at the end of this parallel sequence S1p, S2p.

The implementation further comprises a step which creates a copy of the code of the other parallel sequence S2p, S1p. A join wait function Jw is added at the end of this parallel sequence S2p, S1p.

These two functions, join flag Jf and join wait Jw, combine to implement the join j. Both of them use a common flag associated with the fork f and join j pair. This flag takes the form of a Boolean variable shared among the three functions fork F, join flag Jf, and join wait Jw. This flag indicates the state of execution of the parallel sequence S1p, S2p that incorporates the join flag function Jf. The flag is lowered, after its initialization by the fork function F, until said parallel sequence terminates. It is raised, by the join flag function Jf, when said parallel sequence terminates.

Thus, as indicated above, the fork function, when executed, has initialized the flag to the lowered state. The join flag function, executed at the end of said parallel sequence, raises the flag, indicating this end of execution. When executed, the join wait function Jw knows, because of its position at the end of the sequence, that the parallel sequence containing it has terminated. The join wait function Jw checks the state of the flag to discover whether the other parallel sequence has terminated. If this is not the case, the join wait function Jw waits until the flag is raised.

As soon as the flag is raised, the join wait function Jw transfers the execution stream to the final sequence Sf. As before, this transfer is carried out by a concatenation mechanism, if required.

If the final sequence Sf is allocated to the same core as the parallel sequence incorporating the join wait function Jw, its execution starts when the join wait function Jw has terminated, the execution stream being transmitted naturally to the final sequence Sf whose code is placed after the join wait function Jw. Conversely, if the final sequence Sf is not allocated to the same core as the parallel sequence incorporating the join wait function Jw, the join wait function Jw performs an initiation using a concatenation mechanism.

Thus the join wait function Jw initiates the execution of the final sequence Sf if the core C4 of the final sequence Sf is different from the core C3, C2 of the parallel sequence S2p, S1p comprising the join wait function Jw.

According to another characteristic, the sequence receiving the fork function F is the initial sequence Si. The fork function F is therefore allocated to the same core C1 as the initial sequence Si.

As mentioned above, the two functions, join wait Jw and join flag Jf, are placed respectively at the end of each of the parallel sequences S1p, S2p, one of the parallel sequences S1p, S2p receiving a join wait function Jw and the other of the parallel sequences S2p, S1p receiving a join flag function Jf. It then remains to be seen which of the parallel sequences S1p, S2p receives which function.

The aim here is to minimize the waiting time of the join wait function Jw, in order to optimize the real-time performance. For this purpose, it is advantageous for the parallel sequence S1p, S2p comprising the join wait function Jw to be the longer of the two parallel sequences S1p, S2p. Thus, when the join wait function Jw is executed, it is likely that the parallel sequence S2p, S1p containing the join flag function Jf has terminated. Thus there is no wait.

For this optimization, two cases may be distinguished. In a first case, the final sequence Sf is allocated to a core C4 identical to the core C2, C3 of one of the two parallel sequences S1p, S2p. In this case, this parallel sequence S1p, S2p receives the join wait function Jw and the other parallel sequence S2p, S1p receives the join flag function Jf. This configuration is advantageous in that it enables the join wait function Jw to avoid initiating execution on another core for the final sequence Sf. In terms of timing performance, a possible wait is preferable to initiation of execution of a sequence on another core.

In a second case, the final sequence Sf is allocated to a core C4, different from the cores C2, C3 of the two parallel sequences S1p, S2p. In this case, the parallel sequence S1p, S2$p$ receiving the join wait function Jw is the one that is estimated to require the longest execution time.

According to another characteristic, corresponding to the first case, if the core C4 of the final sequence Sf is identical to a core C2, C3 of a parallel sequence S1$p$, S2$p$, said parallel sequence S1$p$, S2$p$ receives the join wait function Jw and the other parallel sequence S2$p$, S1$p$ receives the join flag function Jf. In this first case, the join wait function Jw is executed on the core C2, C3 of its parallel sequence, this core also being the core C4 of the final sequence Sf.

According to another characteristic, corresponding to the second case, if the core C4 of the final sequence Sf is different from the cores C2, C3 of the parallel sequences S1$p$, S2$p$, the parallel sequence S1$p$, S2$p$ receiving the join wait function Jw is the less reactive parallel sequence of the two parallel sequences S1$p$, S2$p$, that is to say the sequence having a higher response time. In a dual arrangement, the parallel sequence S2$p$, S1$p$ receiving the join flag function Jf is the more reactive parallel sequence of the two parallel sequences S1$p$, S2$p$. In this second case, the join wait function Jw is executed on the core C2 or C3 of its parallel sequence, the join flag function is executed on the other core C3 or C2 of the other parallel sequence.

Reactivity is a factor indicating the response time of an executable unit E or a sequence S. The reactivity becomes higher as the response time becomes lower. Reactivity may be divided into two cumulative reactivities, namely an intrinsic reactivity indicating the execution time of the executable unit E or the sequence S, and an activation and initiation reactivity indicating the external time factors such as the execution initiation time, the number of schedule points, the pre-emption, etc.

According to another characteristic, the join wait function Jw creates a wait, if necessary, by calling a schedule point. A schedule point is a function of the operating system for creating a co-operative wait.

Figure 5:
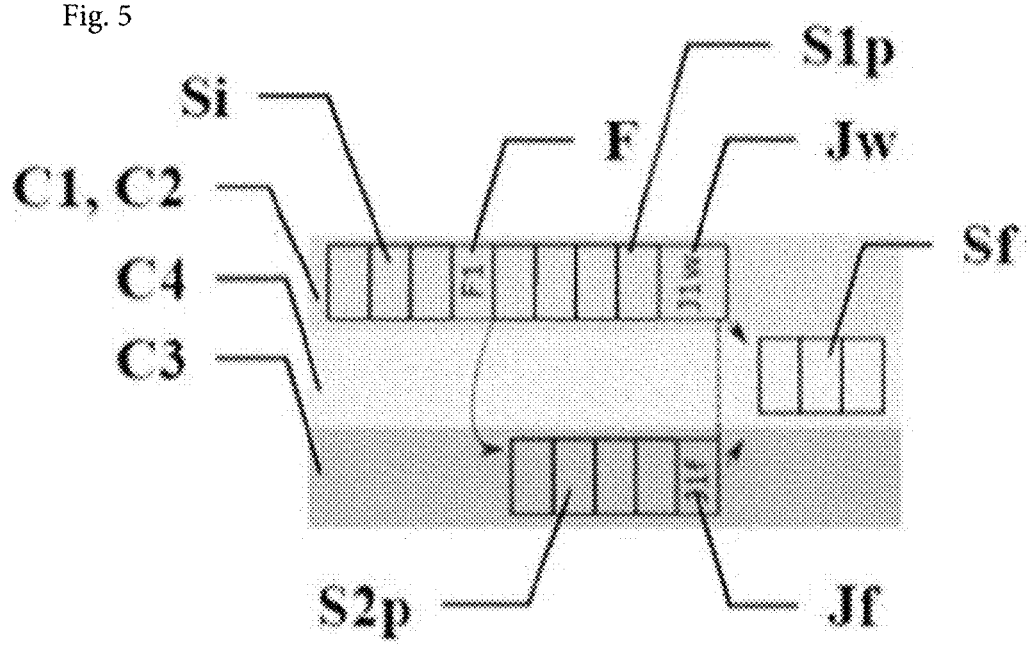
FIG. 5 shows a synoptic diagram of the implementation of the elementary graph of FIG. 4.
Figure 6:
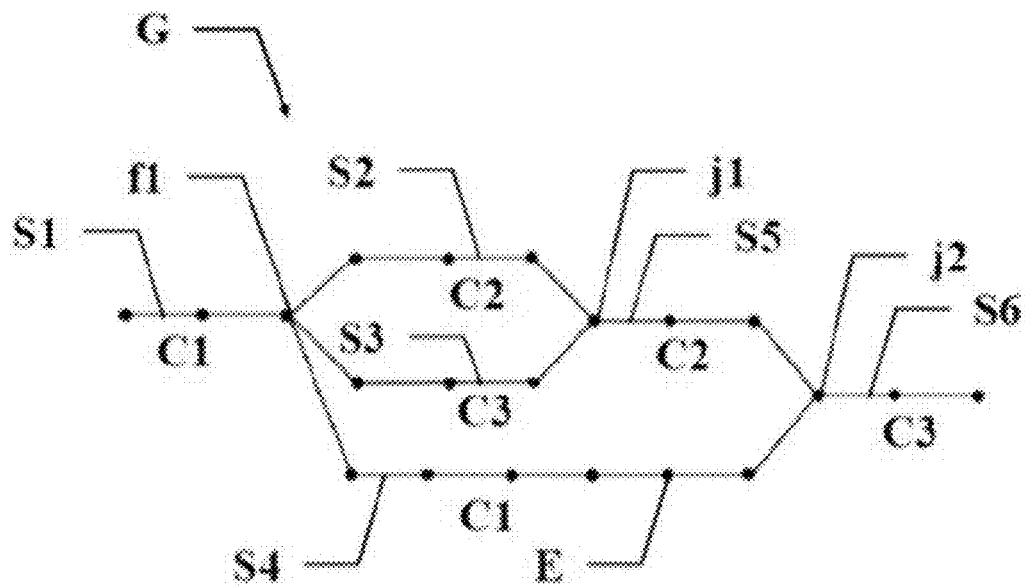
FIG. 6 shows an example of a complex graph.

FIG. 5 illustrates the implementation obtained for an elementary graph Ge, on the assumption of an identity between the cores C1 and C2. The core C1 receives the code of the initial sequence Si, followed by the fork function F, followed by the code of the first parallel sequence S1$p$ and finally the join wait function Jw, assigned here to the first parallel sequence S1$p$ because the latter is the less reactive sequence. The core C3 receives the code of the second parallel sequence S2$p$, terminated by the join flag function Jf. The core C4 receives the code of the final sequence Sf.

The description of the elementary method has now shown how a software module defined by an elementary graph Ge is implemented.

The global method for implementing a software module defined by any graph G conforming to the aforementioned assumptions will now be described.

The principle, illustrated on the basis of a graph G as illustrated in FIGS. 6-10, is that of pre-processing and simplifying the graph G in order to reduce it to one or more successive or nested elementary graphs Ge, and then applying the elementary method described above to each of these elementary graphs Ge.

According to another characteristic, the global method for implementing a software module defined by a non-interleaved directed acyclic graph G comprising executable units E, each allocated to one core C1-C4, comprises the following steps.

Figure 17:
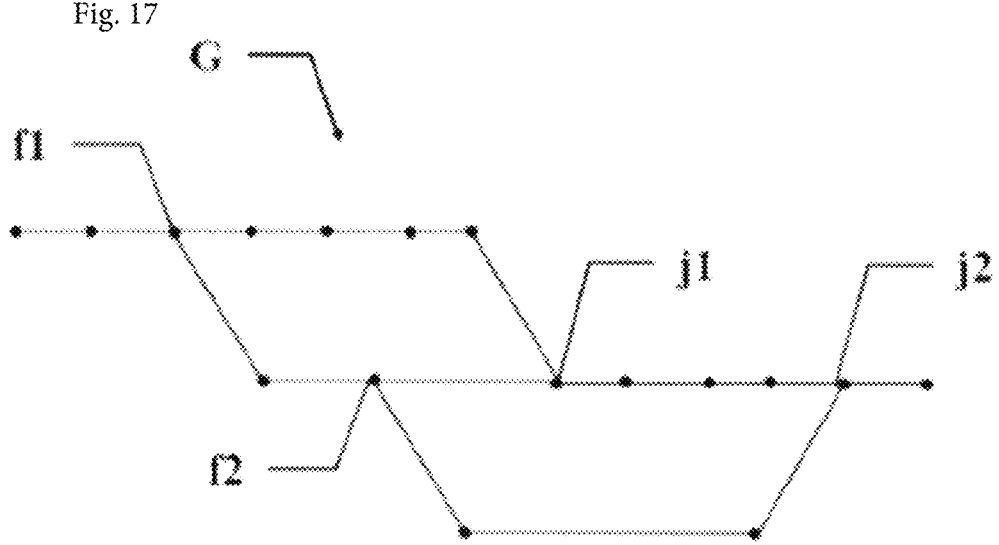
FIG. 17 shows an interleaved graph.

A graph G is said to be non-interleaved in that it comprises no interleaving. As shown in FIG. 17, interleaving comprises two interleaved fork and join pairs (f1, j1) and (f2, j2). In the first pair f1, j1, one of the parallel sequences is interrupted by the second fork f2, located between the first fork f1 and the first join j1, and, reciprocally, in the second pair f2, j2 one of the parallel sequences is interrupted by the first join j1, located between the second fork f2 and the second join j2. Such an interleaved graph G cannot be reduced to elementary graphs Ge. In other words, a non-interleaved graph G is a graph G that is reducible to elementary graphs Ge. This constraint makes it possible to process graphs G corresponding to many real cases. Any graph G can be processed by pre-processing it in order to reduce it to a non-interleaved graph. Alternatively, any graph can be resolved by another method. These two forms of processing are not described herein.

Firstly, the graph G or its representation is scanned and analyzed topologically. In a first step, all the forks f are identified. A fork f is characterized by an executable unit comprising a single upstream executable unit or sequence Sm, Sm1-Sm3 and at least two downstream executable units or sequences Sv, Sv1-Sv3.

In a second step, all the joins j are identified. A join j is characterized by an executable unit comprising at least two executable units or sequences Sm1-Sm3 upstream and a single executable unit or sequence Sv, Sv1-Sv3 downstream.

In a third step, all the sequences S, S1-S6 are identified. A sequence S is characterized by a succession of executable units E comprising no forks f or joins j and all allocated to the same core C1-C4.

A multiple fork is defined, in the present document, by a fork f comprising a number n, strictly greater than 2, of downstream sequences Sv, Sv1-Sv3. A simple or two-way fork is defined, in the present document, by a fork f comprising exactly 2 downstream sequences Sv, Sv1-Sv3.

Figure 11:
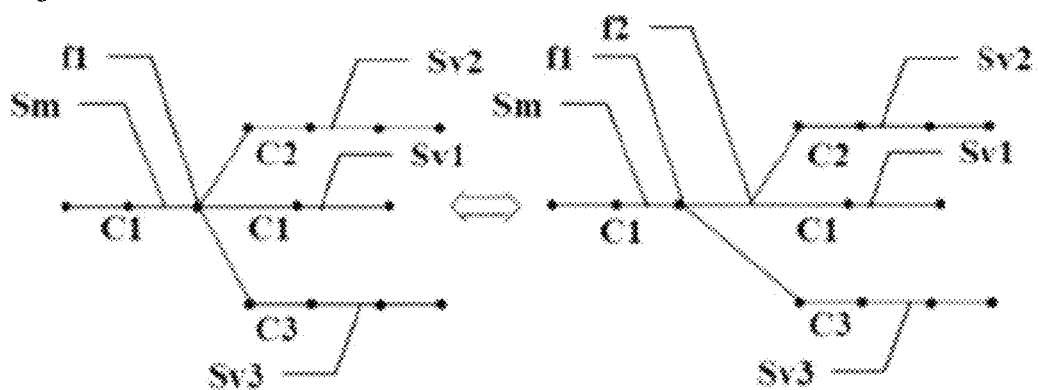
FIG. 11 shows the simplification of a multiple fork.

In a fourth step, the multiple forks f are simplified. A multiple fork f is simplified by replacing it with n-1 two-way or simple forks f. As illustrated in FIG. 11, this is done by adding n-1 additional forks fat the place of the original fork f.

The additional forks f, created in this way on this occasion, are allocated to the core of the upstream sequence Sm of the original fork f.

Figure 12:
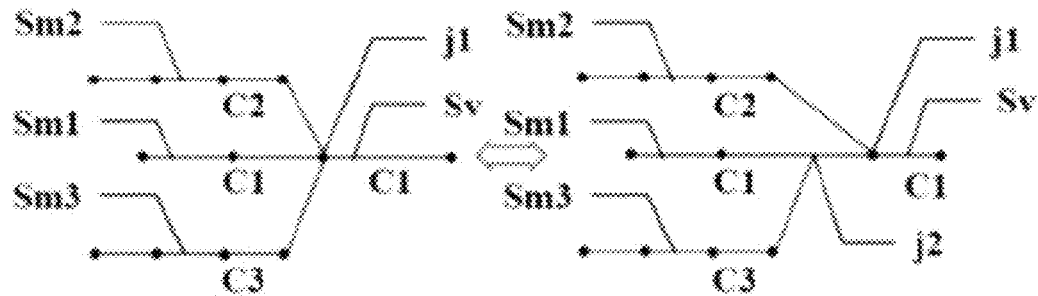
FIG. 12 shows the simplification of a multiple join.
Figure 13:
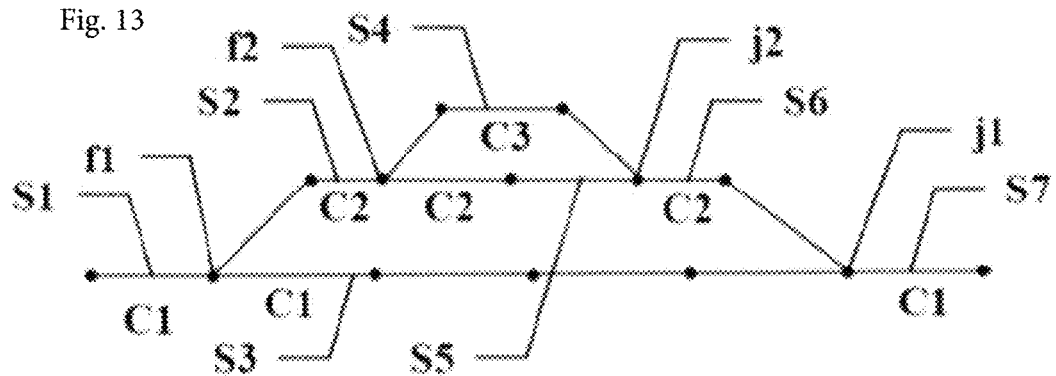
FIG. 13 shows another example of a graph.
Figure 14:
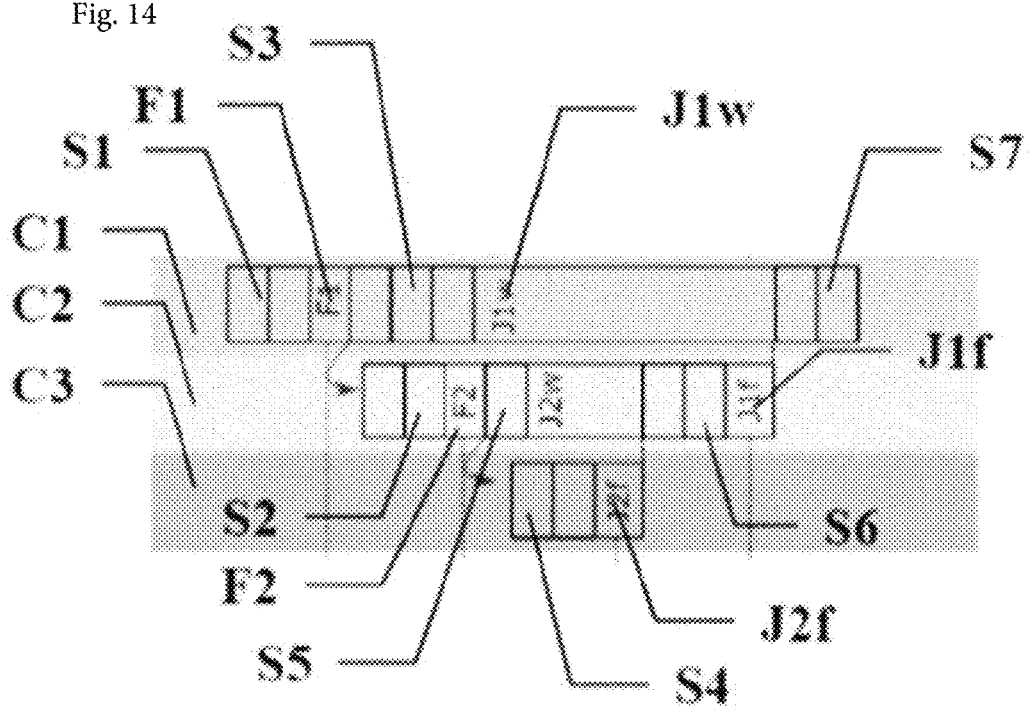
FIG. 14 shows a synoptic diagram of the implementation of the graph of FIG. 13.

In a fifth step, the multiple joins j are simplified. A multiple join j is simplified by replacing it with n-1 two-way or simple joins j. As illustrated in FIG. 12, this is done by adding n-1 additional joins j at the place of the original join j.

The additional joins j, created in this way on this occasion, are allocated to the core of the downstream sequence Sv of the original join j.

In a sixth step, after all the simplifications have been carried out, each join j is paired with a dual fork f.

This is done as follows. For each join j, the graph G is traced upward, along the upstream sequences Sm1, Sm2 of the join j, until any fork f where the upstream sequences Sm1, Sm2 join is found. Said join j is then associated with this fork f.

Figure 16:
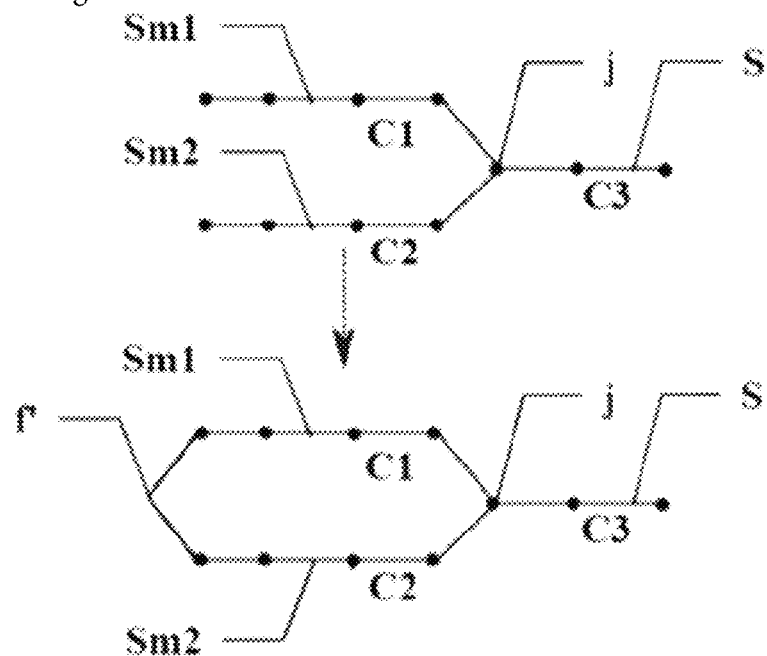
FIG. 16 shows the creation of a virtual fork for an orphan join.

The pairing step may cause the appearance of an orphan join j, in other words a join j for which there is no associated fork. In this case, as illustrated in FIG. 16, a virtual fork f' is created in a seventh step. This virtual fork f' is placed at the very beginning of the upstream sequences Sm1, Sm2 of the join j, and joins the upstream sequences Sm1, Sm2. This virtual fork f' is then paired with the orphan join j. The pair consisting of the virtual fork f' and the orphan join j is then processed like any other pair.

Figure 15:
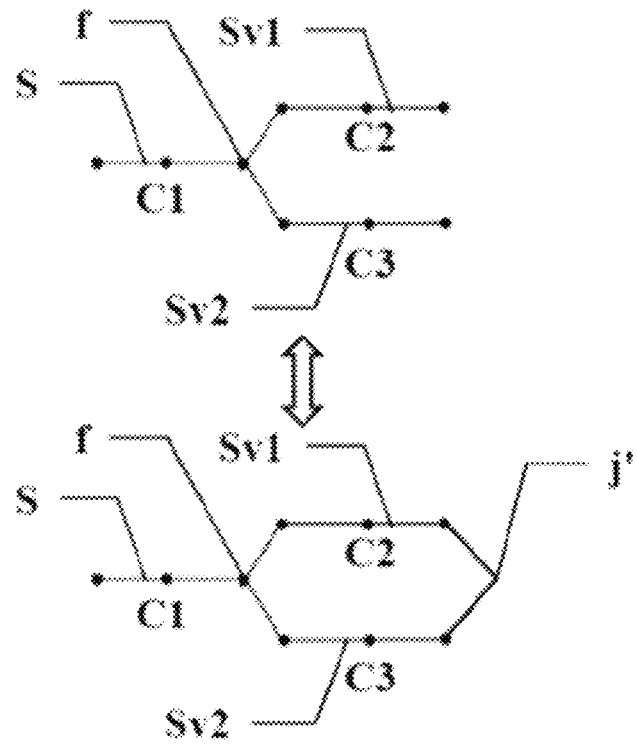
FIG. 15 shows the creation of a virtual join for an orphan fork.

The pairing step may also, in a dual manner, cause the appearance of an orphan fork f, in other words a fork f for which there is no associated join. In this case, as illustrated in FIG. 15, a virtual join j' is created in an eighth step. This virtual join j' is placed at the very end of the downstream sequences Sv1, Sv2 of the fork f, and joins the downstream sequences Sv1, Sv2. This virtual join j' is then paired with the orphan fork f. The pair consisting of the fork f and the virtual join j' is then processed like any other pair.

The graph G, simplified in this way and supplemented with virtual forks f' or virtual joins j' if necessary, may then be analyzed as a superimposition of sequenced or interleaved elementary graphs Ge.

Then, in a ninth step, one of the elementary methods described above is applied to each pattern reproducing an elementary graph Ge, as defined/framed by a dual fork f and join j pair.

The lower-level elementary graphs Ge are identified and processed first. They are then implemented by one of the elementary methods. When an elementary graph Ge has been implemented, it can be reordered in a tenth step. Reordering consists in modifying the graph G by replacing every implemented elementary graph Ge by a single point E', E" similar to an executable unit E. The ninth and tenth steps are repeated until the graph G is exhausted, that is to say until only a linear graph remains.

According to another characteristic, a virtual fork f' is allocated to the core of the more reactive of the upstream sequences Sm1, Sm2 of its associated join j.

According to another characteristic, a number of possible choices or combinations for association may appear at a given join in the pairing step. In this case, the pairs whose joins j appear in the fewest combinations are prioritized for association. At each pairing, accepting a fork f and a join j, all the combinations, including said fork f or said join j are withdrawn. This is then iterated until all the forks and all the joins are paired. By default, if there is still a number of combinations at an iteration, one of them is chosen arbitrarily.

The global method, and particularly its steps eight to ten, are illustrated by means of an example with reference to FIGS. 6-10. The graph G of FIG. 6, which depicts the input graph G of the global method, is analyzed to execute the identification steps. The graph G comprises six sequences S1-S6. The cores C1-C3 assigned to each sequence S1-S6 are indicated under each of the sequences S1-S6. A first sequence S1 leads to a first fork f1, followed by three downstream sequences S2, S3, S4. The sequences S2 and S3 are parallel and lead to a first join j1. A sequence S5 follows said join j1. The sequences S4 and S5 meet at a second join j2. A sequence S6 follows said join j2.

The first fork f1 is multiple, in that it comprises 3 downstream sequences S2, S3, S4. It must therefore be simplified. The two joins j1, j2 are simple, in that they comprise exactly 2 upstream sequences S2, S3 and S4, S5 respectively.

Figure 7:
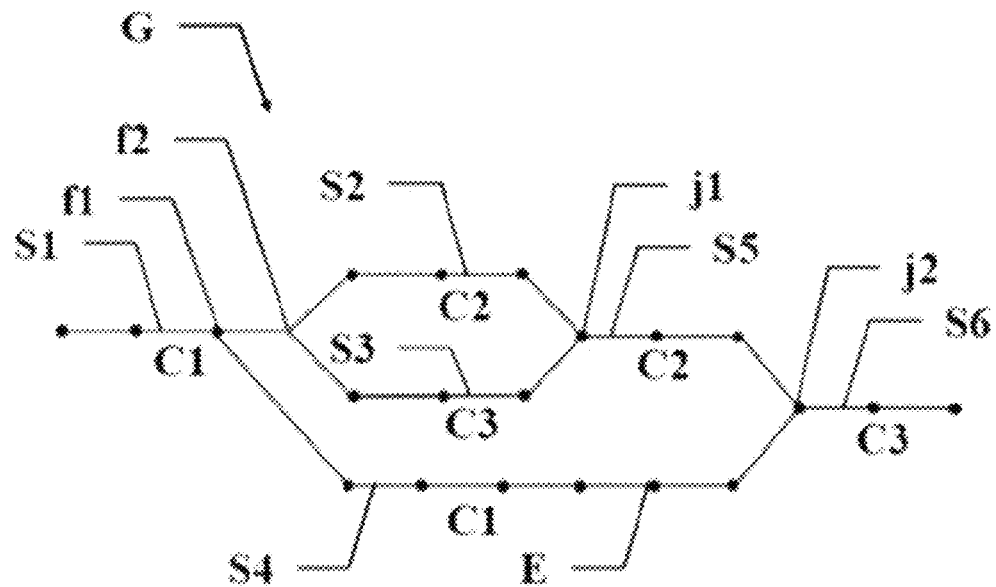
FIG. 7 shows the graph of FIG. 6 after simplification.

The result of the simplification is illustrated in FIG. 7. The graph G of FIG. 7 adds a second two-way fork f2 which comprises two downstream sequences S2 and S3. The first fork f1 is modified to become two-way: toward the second fork f2 on the one hand, and toward the downstream sequence S4 on the other hand.

When the graph G of FIG. 7 has been simplified, the forks and joins can be paired. By tracing the upstream sequences S2, S3 upward from the first join j1, the first fork f1 and the second fork f2, where the upstream sequences S2, S3 join, are found. This results in two possible pairs or combinations (f1, j1) and (f2, j1). By tracing the upstream sequences S4 and S5 upward from the second join j2, the first fork f1 is found. This results in a single possible pair or combination (f1, j2). As described above, the pairing starts with the possibilities exhibiting fewest combinations. Thus the pair (f1, j2) is validated, for the second join j2. Thus the first fork f1 is no longer available and eliminates the combination (f1, j1) from the two combinations for the first join j1. Thus the remaining combination (f2, j1) is the only one left for the first join j1, and it is therefore validated. All the forks f1, f2 and all the joins j1, j2 are paired, so the pairing step terminates. There are no orphan forks or joins here.

Analysis of the graph G reveals a first elementary graph for the pair f2, j1. This first elementary graph may be implemented by the elementary method.

Figure 8:
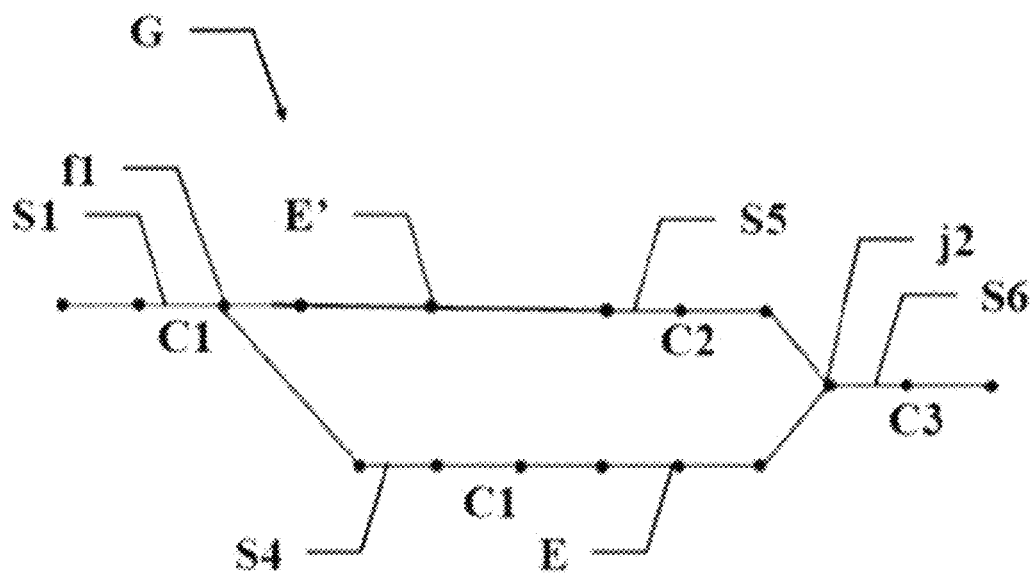
FIG. 8 shows the graph of FIG. 6 after implementation of a first elementary graph and a first reordering.

After the implementation of said first elementary graph, the reordering step carries out a first reordering and replaces said first elementary graph with a point E', resulting in the graph G shown in FIG. 8.

The first reordering creates a second elementary graph framed by the pair f1, j2. This second elementary graph may be implemented by the elementary method. After the implementation of said second elementary graph, the reordering step carries out a second reordering and replaces said second elementary graph with a point E", resulting in the graph G shown in FIG. 9.

Figure 9:
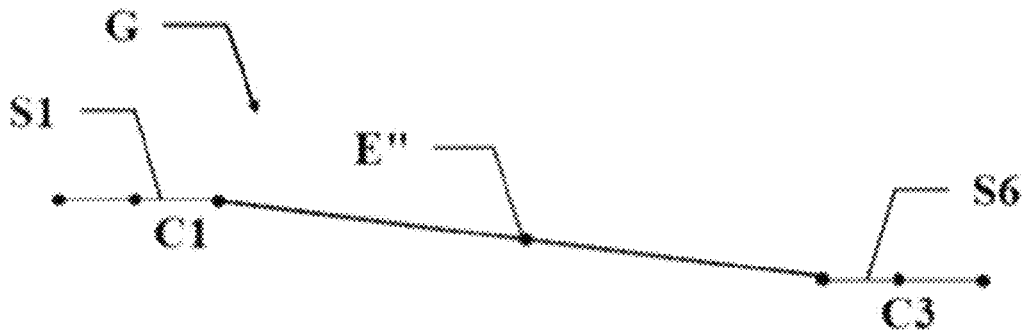
FIG. 9 shows the graph of FIG. 6 after implementation of a second elementary graph and a second reordering.
Figure 10:
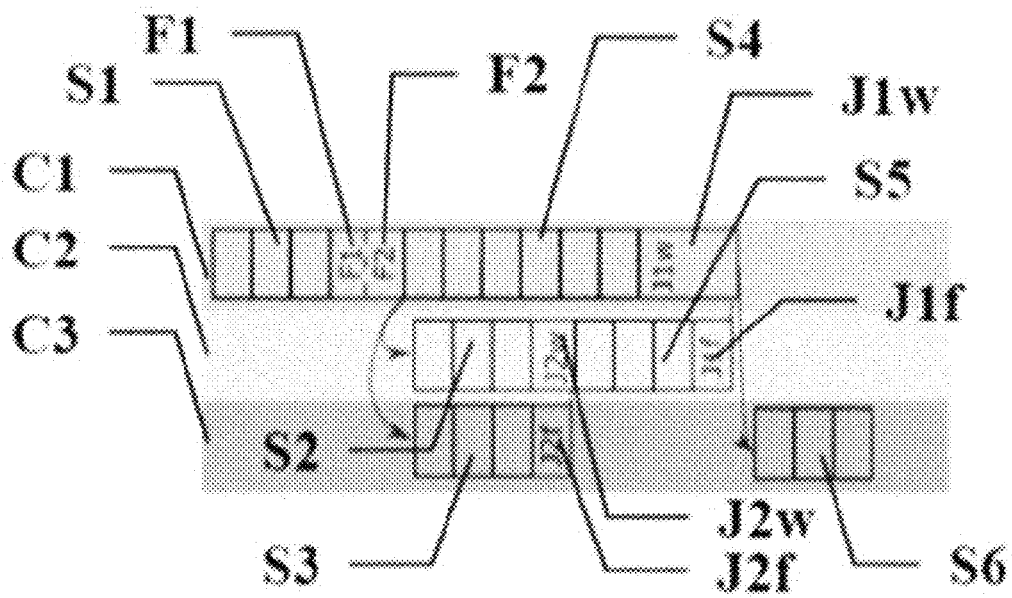
FIG. 10 shows a synoptic diagram of the implementation of the graph of FIG. 6.

The graph G of FIG. 9 is linear. Thus the graph G is exhausted and the implementation terminates. FIG. 10 summarizes the implementation corresponding to the graph G. The first fork f1 is implemented by a first fork function F1. The second fork f2 is implemented by a second fork function F2. The first join j1 is implemented by a first join wait function J1w and by a first join flag function J1f. The second join j2 is implemented by a second join wait function J2w and by a second join flag function J2f. The code of each of the sequences S1-S6 is indicated by the reference S1-S6 of the sequence.

An aspect of the invention has been illustrated and described in detail in the drawings and the preceding description. The latter should be considered as illustrative and given by way of example and not as limiting an aspect of the invention to this description only. Numerous embodiment variants are possible.

LIST OF REFERENCE SIGNS

C1-C4: core
E: executable unit
E', E": reordering point
f, f1, f2: fork
f': virtual fork
F: fork function
G: graph
Ge: elementary graph
j, j1, j2: join
j': virtual join
Jf, J1f, J2f: join flag function
Jw, J1w, J2w: join wait function
S, S1-S6: sequence
S1p, S2p: parallel sequence
Sf: final sequence
Si: initial sequence
Sm, Sm1, Sm2, Sm3: upstream sequence
Sv, Sv1, Sv2, Sv3: downstream sequence

The invention claimed is:

1. A method for implementing a software module defined by a directed acyclic elementary graph comprising executable units arranged in four sequences, each sequence of the four sequences allocated to a core, namely an initial sequence executable on a first core, followed by a fork to a first parallel sequence executable on a second core and a second parallel sequence executable on a third core, different from the second core, in parallel with the first parallel sequence, the first and second parallel sequences being followed by a join to a final sequence executable on a fourth core, the method comprising:
- copying a code of the initial sequence,
- adding a fork function at the end of the initial sequence,
- copying a code of the first parallel sequence,
- adding a join flag function at the end of the first parallel sequence,
- copying a code of the second parallel sequence,
- adding a join wait function at the end of the second parallel sequence,
- implementing the software module defined by the directed acyclic elementary graph, and
- executing the software module defined by the directed acyclic elementary graph on a multi-core microprocessor to control an engine of a motor vehicle.

2. The method as claimed in claim 1, wherein the fork function initiates the execution of the first parallel sequence if the second core of the first parallel sequence is different from the first core of the initial sequence, initiates the execution of the second parallel sequence if the third core of the second parallel sequence is different from the first core of the initial sequence, and initializes a join flag to a lowered state.

3. The method as claimed in claim 2, wherein the join flag function raises the join flag.

4. The method as claimed in claim 2, wherein the join wait function waits until the join flag is lowered, and initiates an execution of the final sequence if the fourth core of the final sequence is different from the third core of the second parallel sequence comprising the join wait function when the join flag is raised.

5. The method as claimed in claim 1, wherein a sequence receiving the fork function is the initial sequence.

6. The method as claimed in claim 1, wherein, if the fourth core of the final sequence is identical to a core of a parallel sequence, the parallel sequence receives the join wait function.

7. The method as claimed in claim 1, wherein, if the fourth core of the final sequence is different from the second and third cores of the first and second parallel sequences, a parallel sequence receiving the join wait function is a less reactive parallel sequence of the first and second parallel sequences, and wherein the less reactive parallel sequence of the first and second parallel sequences is the parallel sequence having a higher response time.

8. The method as claimed in claim 1, wherein the join wait function waits while calling a schedule point.

9. A method for implementing a software module defined by a non-interleaved directed acyclic graph, comprising executable units, each executable unit allocated to one core, the method comprising:
- identifying a plurality of forks, wherein a fork of the plurality of forks comprises at least two downstream executable units,
- identifying a plurality of joins, wherein a join of the plurality of joins comprises at least two upstream executable units,
- identifying a plurality of sequences, wherein each sequence of the plurality of sequences is a succession of executable units comprising no forks or joins and allocated to a same core,
- simplifying the plurality of forks, comprising an upstream sequence and a number n, strictly greater than 2, of downstream sequences, by replacing the plurality of forks with n-1 two-way forks, comprising two downstream sequences, wherein the n-1 two-way forks thus created are allocated to a core of the upstream sequence,
- simplifying the plurality of joins, comprising a downstream sequence and a number n, strictly greater than 2, of upstream sequences, by replacing the plurality of forks with n-1 two-way joins, comprising two upstream sequences, wherein the n-1 two-way joins thus created are allocated to a core of the downstream sequence,
- pairing each join of the plurality of joins with a dual fork for each join of the plurality of joins, tracing the upstream sequences until any fork where the upstream sequences meet is found, and associating a found fork with the join of the plurality of joins,
- if a join is an orphan, creating a virtual fork, at the start of the upstream sequences, joining the upstream sequences,
- if a fork is an orphan, creating a virtual join, at the end of the downstream sequences, joining the downstream sequences,
- for each dual fork and join pair defining a directed acyclic elementary graph, applying the method as claimed in claim 1,
- reordering the directed acyclic elementary graph into an executable unit, and
- iterating the two preceding steps until the directed acyclic elementary graph is exhausted.

10. The method as claimed in claim 9, wherein a virtual fork is allocated to a core of a more reactive upstream sequence of the upstream sequences of an associated join.

11. The method as claimed in claim 9, wherein, in the pairing step, if a plurality of choices are possible, prioritizing an association of pairs whose joins have the fewest combinations or choosing arbitrarily.

* * * * *